US008447258B2

(12) United States Patent
Morris

(10) Patent No.: US 8,447,258 B2
(45) Date of Patent: May 21, 2013

(54) FILTERING COMMUNICATIONS CHANNELS WITHIN TELECOMMUNICATIONS SATELLITES

(75) Inventor: Ian Morris, Bognor Regis (GB)

(73) Assignee: Astrium Limited, Stevenage, Hertfordshire (GB)

( * ) Notice: Subject to any disclaimer, the term of this patent is extended or adjusted under 35 U.S.C. 154(b) by 333 days.

(21) Appl. No.: 12/809,473

(22) PCT Filed: Dec. 19, 2008

(86) PCT No.: PCT/EP2008/068029
§ 371 (c)(1),
(2), (4) Date: Aug. 3, 2010

(87) PCT Pub. No.: WO2009/080754
PCT Pub. Date: Jul. 2, 2009

(65) Prior Publication Data
US 2010/0297977 A1    Nov. 25, 2010

(30) Foreign Application Priority Data

Dec. 21, 2007   (EP) ..................................... 07270078
Dec. 21, 2007   (GB) ..................................... 0724910.5

(51) Int. Cl.
*H04B 1/10*          (2006.01)
(52) U.S. Cl.
USPC .......................................... 455/307; 455/296
(58) Field of Classification Search
USPC ............. 455/307, 177.1, 340, 339, 12.1, 306, 455/188.1, 278.1, 63.1, 296
See application file for complete search history.

(56) References Cited

U.S. PATENT DOCUMENTS

| 4,262,361 | A  |   | 4/1981  | Hauer |
| 6,185,408 | B1 | * | 2/2001  | Leopold et al. ............... 455/12.1 |
| 6,724,840 | B1 |   | 4/2004  | Osofsky et al. |
| 7,706,746 | B2 | * | 4/2010  | Karabinis et al. ............. 455/12.1 |
| 7,831,251 | B2 | * | 11/2010 | Karabinis et al. ............. 455/427 |

(Continued)

FOREIGN PATENT DOCUMENTS

| EP | 1311095            | 12/2006 |
| WO | WO 2006/043115 A1  | 4/2006  |
| WO | WO 2006/085116 A1  | 8/2006  |

OTHER PUBLICATIONS

International Search Report dated Mar. 4, 2009.

(Continued)

*Primary Examiner* — Sonny Trinh
(74) *Attorney, Agent, or Firm* — Buchanan Ingersoll & Rooney PC

(57) ABSTRACT

A method is disclosed for filtering communications channels in a telecommunications satellite to remove large unwanted interfering signals, which includes monitoring channels of an uplink signal by stepping across a channel with a first analog agile filter having a narrow bandwidth in relation to the channel, and at each step monitoring the signal within the channel step, in order to determine the presence of interfering signals, and configuring a second analog agile filter having an adjustable band stop function to block the interfering signals. The uplink signal has first and second signal paths for the uplink signal, and the method includes demultiplexing the channels of the uplink signal onto separate lines in the first path, carrying out the band stop function within the second signal path, and replacing with the remaining filtered part of the channel, by a switching operation, the demultiplexed version of the channel.

14 Claims, 2 Drawing Sheets

U.S. PATENT DOCUMENTS

| | | | |
|---|---|---|---|
| 8,238,866 B2 * | 8/2012 | Morris | 455/307 |
| 8,248,977 B2 * | 8/2012 | Harverson | 370/310.2 |
| 2008/0090516 A1 | 4/2008 | Thomas et al. | |

OTHER PUBLICATIONS

Written Opinion of the International Searching Authority dated Mar. 4, 2009.

European Search Report dated May 23, 2008.

United Kingdom Search Report dated Mar. 25, 2008.

Notification Concerning Transmittal of International Preliminary Report on Patentability (Forms PCT/IB/326 and PCT/IB/373) and the Written Opinion of the International Searching Authority (Forms PCT/ISA/237) issued in corresponding International Application No. PCT/EP2008/068029 dated Jul. 1, 2010.

Decision on Grant dated Feb. 1, 2013, corresponding Russian Application No. RU 2280957; with Report on Examination results on Application No. 2010130558/07(043329), filed Dec. 19, 2008.

* cited by examiner

FILTERING COMMUNICATIONS CHANNELS WITHIN TELECOMMUNICATIONS SATELLITES

FIELD OF THE INVENTION

The present invention relates to the filtering of communications channels between uplink and downlink beams within telecommunications satellites.

BACKGROUND ART

A common problem with telecommunications satellites is that of strong interference signals at certain frequencies, occupying one or more communications channels. This may arise for example by another operator leaving equipment on and unsupervised, or with antennae pointing in the wrong direction. This interfering signal may automatically be amplified by the satellite, and may render communications channels unusable. It may even allow unauthorised use of the broadcast function of the satellite by an unauthorised user.

WO 2006/043115 discloses a cost-effective analog mechanism that enables flexibility in the routing of channels between uplink and downlink beams, wherein all uplink channels from a variety of microwave bands are converted to a first IF, and agile filters are employed to filter and translate selected channels to a second IF, in order to group the selected channels together for transmission on a downlink beam.

Agile filters are known, and are for example described in U.S. Pat. No. 4,262,361, and WO 2006/085116, which provide a variable bandpass or bandstop function, with a mechanism for adjusting the position of bandpass edges, both in terms of centre frequency and in terms of width of the band. Such mechanism comprises a series of mixers for receiving the input signal and variable frequency local oscillator signals, for adjusting the position of the input signal by desired amounts in relation to filter edges.

SUMMARY OF THE INVENTION

It is an object of the invention to provide a filtering mechanism for a telecommunications satellite, which blocks interfering signals at communications frequencies.

The concept of the invention is to provide, in an analog arrangement for routing communications channels in a telecommunications satellite, a number of analog filters, which serve to locate interfering signals in one or more communications channels, and then to act as a band stop to cut out located interfering signals.

The invention provides in a first aspect a method of filtering channels in a telecommunications satellite, comprising monitoring at least one channel of an uplink signal by stepping across said one channel with a first analog agile filter having a narrow bandwidth in relation to the channel, and at each step monitoring the signal within the channel step, in order to determine the presence of interfering signals, providing second analog filter means having an adjustable band stop function, and configuring said second filter means to block said interfering signals.

As preferred, in order to save that part of a channel which is unaffected by interference, the method includes providing first and second signal paths for said uplink signal, demultiplexing the channels of said uplink signal onto separate lines in said first path, carrying out said band stop function within said second signal path, providing to said first path a remaining filtered part of said one channel and replacing, by means of a switching operation, the demultiplexed version of said one channel, with said remaining filtered part.

In a second aspect, the invention provides a channel filtering apparatus for a telecommunications satellite, including monitoring means, for monitoring at least one communication channel of an uplink signal, for detection of interfering signals, including first analog agile filter means for stepping across said one channel and having a narrow bandwidth in relation to said one channel, and means for determining within each step the presence of an interfering signal, and second analog filter means responsive to said monitoring means, which provides an adjustable band stop function for blocking said interfering signal.

In a preferred embodiment, said first analog agile filter has a relatively small bandwidth, for example between 100 KHz and 1 MHz, for example covering a single voice channel within a communications channel, and the centre frequency of the agile filter bandwidth is stepped through all the communications channels within the microwave band of interest. At each step, the signal power within the bandwidth of the filter is determined. An assessment (which may be done by a ground station by way of a telemetry link) is made of those channels which contain an interfering signal, and one or more further analog agile filters, is adjusted to be positioned over the interfered channels, to provide a bandstop function with an appropriate amount of attenuation, for example 20 dB.

Whereas agile filters in communications satellites may often configured to provide a variable band pass filter function, a further analog filter may be specifically configured to provide a bandstop function in that the lower frequency edge of the filter provides a low pass filter function, and the higher frequency edge provides a high pass filter function. As an alternative arrangement, since agile filters are commonly configured as band pass filters, two such agile band pass filters may be provided in parallel signal paths, the first band pass filter being set to define a lower edge of the band stop function, and the second filter being set to define the upper edge of the band stop function.

The agile filters employed in the present invention have various functions, and may be of different constructions to carry out these functions. For example said first agile filter may have a fixed bandwidth, but the centre frequency is variable. The second analog filter function may include an agile filter wherein only one filter edge is adjustable. In accordance with the invention, an analog agile filter is to be understood as including a first filter for defining one edge of the filter bandwidth, a first mixer for translating the frequency of an input signal by a first predetermined amount in relation to the first filter edge, and a local oscillator means for providing a first local oscillator frequency to said first mixer.

Whilst various forms of agile filter are described in the art, one particular form of agile filter that may be employed is that described in U.S. Pat. No. 4,262,361.

BRIEF DESCRIPTION OF THE DRAWINGS

Preferred embodiments of the invention will now be described with reference to the accompanying drawings wherein.

DESCRIPTION OF THE PREFERRED EMBODIMENTS

The following description of the preferred embodiments is concerned with communications satellites operating in the FSS mode in the Ku band, 12-18 GHz, with communications channels about 50 MHz wide. Each communication channel may be subdivided into voice channels, each of the order of 100's of KHz wide, or subdivided into video channels, which may be much wider, a single channel possibly occupying the whole bandwidth. Nevertheless, the invention is applicable to satellites operating in DBS mode and in any microwave band.

Figure 1:
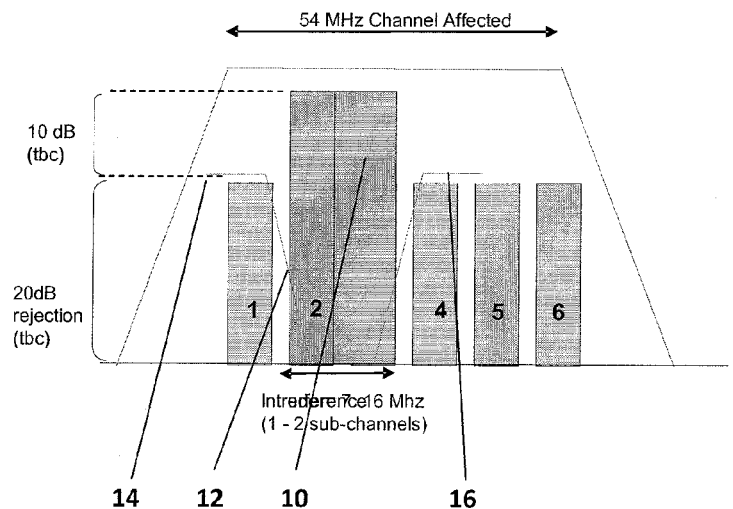
FIG. 1 is a schematic diagram illustrating the concept of the present invention.

The concept of the invention is illustrated in FIG. 1, where a single 54 MHz channel is divided into six separate sub channels, 1-6. An interference signal 10 is shown in the frequency range 7-16 MHz of the channel, blocking sub channels 2 and 3. A band stop function 12 is imposed on the channel to remove the interference. This results in two smaller channels 14, 16 on either side of band stop 12. These two smaller channels are subsequently combined and reused as a single downlink channel, as will be described.

Figure 2:
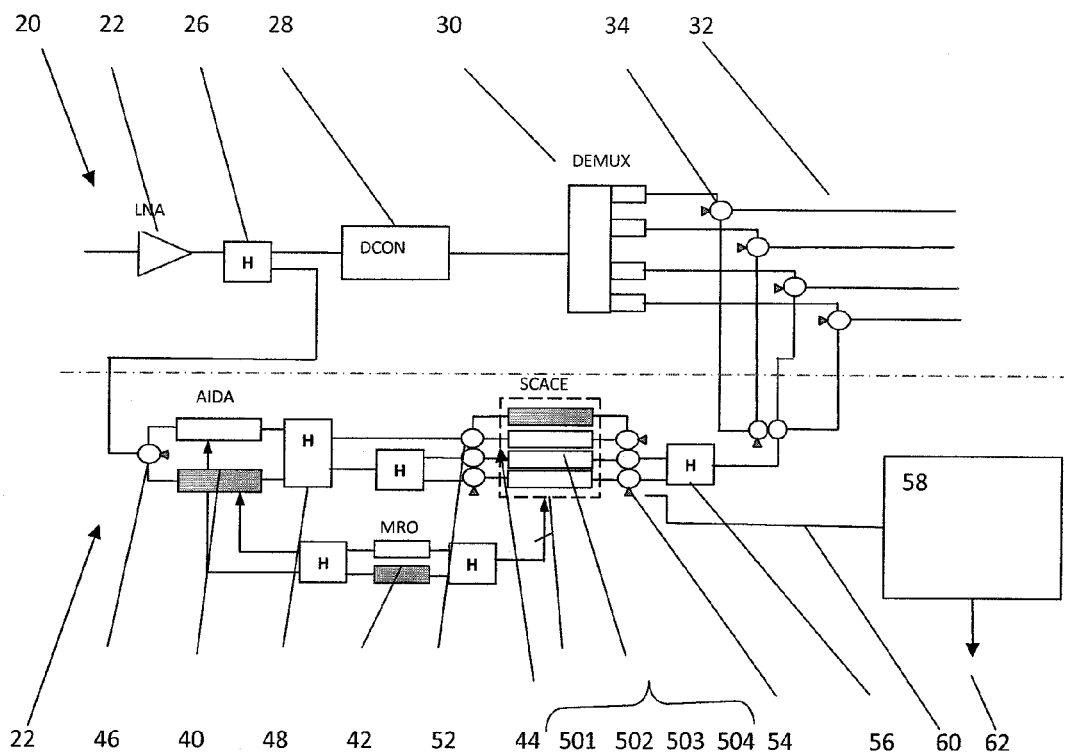
FIG. 2 is a schematic block diagram of a first embodiment of the invention.

Referring to FIGS. 1 and 2, there is shown a main signal path 20 for an uplink signal, and an interference rejection (IR) path 22 for the uplink signal. Main signal path 22 comprises a low noise amplifier 24, a hybrid 26 for splitting the uplink signal, a downconverter 28 for downconverting the uplink signal from 14 GHz to 6 GHz, and a DEMUX 30, for demultiplexing the channels of the uplink signal on separate lines 32. A bank of three port switches 34 are connected in lines 32. IR path 22 receives the uplink signal from hybrid 26, and includes an agile downconverter 40 for converting the uplink frequency to an appropriate IF frequency. Agile downconverter 40 is employed for the situation where different microwave frequency bands are processed. Two downconverters 40 are employed for redundancy, as are two master oscillators 42, which supply the downconverters 40 and a bank of agile filters 44. A switch 46 and hybrids 48 are employed to route the signals between units 40, 42 and 44.

Filter bank 44 comprises four separate agile filters 501-504, filter 501 being provided for redundancy. Filters 502, 503 are provided for are employed for providing band stop function 12 (FIG. 1) and filter 504 is employed for monitoring the channel. Each filter may be of a construction as shown in U.S. Pat. No. 4,262,361. Switches 52, 54 switch uplink signals through the filter bank, and couple, together with hybrid 56, the outputs of the filters to switches 32. An electrical control unit 58 senses filter outputs at 60 and controls operation of the circuit of FIG. 2, and a ground station telemetry link 62.

In operation of the circuit, filter 504 monitors by using a narrow band channel configuration of 1 MHz stepped systematically across the required portion of the Ku-band. At each step the total power within this narrow band will be sensed at 60 and reported by control 58 to a ground station by link 62. Having determined that certain frequencies within the channel contain interference, as in FIG. 1, the ground station transmits via link 62 commands to control 58, for configuration of filters 502, 503. The upper filter edge of filter 502 defines the upper frequency edge of sub channel 14, and the lower filter edge of filter 503 defines the lower edge of sub channel 16 in FIG. 1. This is carried out in known manner using frequency conversion techniques within each filter. Having configured the filters, the two smaller channels 14, 16 are combined in hybrid 56 and the appropriate switch of switch bank 32 is actuated to replace the combined signal for the corresponding channel output from DEMUX 30.

In use the filter 504 will continually monitor the uplink signal to determine how interference conditions may be changing, and control 58 will take appropriate steps to adjust operation of the band stop and channel recovery functions.

Figure 3:
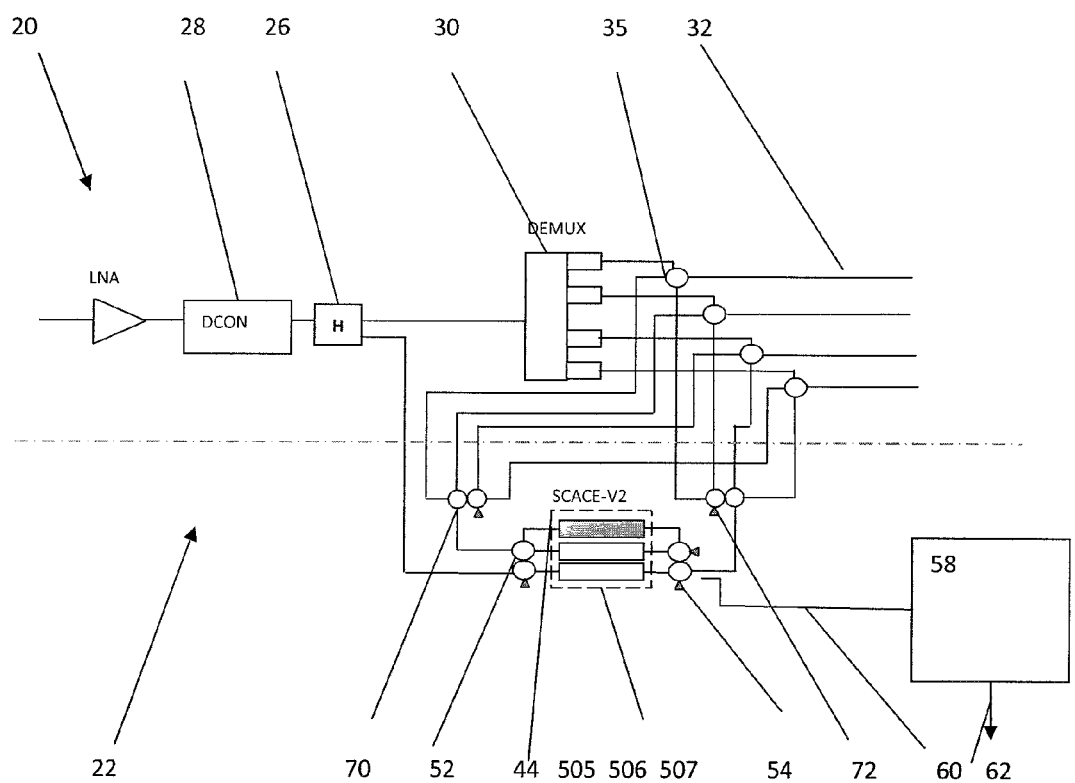
FIG. 3 is a schematic block diagram of a second embodiment of the invention.

Referring now to the second embodiment of the invention shown in FIG. 3, similar parts to those of FIG. 1 are referred to by the same reference numerals. In FIG. 3, downconversion takes place from an incoming 14 GHz signal to 12 GHz in downconverter 28. This high IF simplifies the IR section 22, in that agile downconversion is not required. The uplink signal from hybrid 26 is applied to filter bank 44. Bank 44 comprises three agile filters 505, 506, 507 whose inputs and outputs are controlled by switches 52, 54. Filter 505 is provided for redundancy, filter 506 for providing a bandstop function, and filter 507 for providing a monitoring function. Each filter includes an integral oscillator. The outputs of DEMUX 30 are coupled to the inputs of the filter bank 44 via switches 35, 70. The outputs of filters 504, 505 are coupled via switches 72 to switch bank 35, which comprises four bank switches.

In this embodiment, filter 506 is specifically configured as a bandstop filter. Further filter 506 may include two separate band stop filters that are selectively switched into the signal path, depending on whether a wide band stop or a narrow band stop is required.

In operation of the circuit, filter 507 performs a monitoring operation by using a narrow band channel configuration of 1 MHz stepped systematically across the required portion of the Ku-band. At each step the total power within this narrow band will be sensed at 60 and reported by control 58 to a ground station by link 62. Having determined that certain frequencies within the channel contain interference, as in FIG. 1, the ground station transmits via link 62 commands to control 58, for configuration of filter 506 to provide a band stop function over the interference frequency region. In addition, the affected channel is switched into the input of filter 506 by means of switches 35, 70. The output of filter 506, representing the two smaller channels on either side of the interfered region, are switched back into the output line 32 by means of switches 72, 35.

This configuration therefore represents a simplification of the configuration of FIG. 2.

In regard to the specific construction of the agile filters, whilst these filters are of known construction, as for example in U.S. Pat. No. 4,262,361, and WO 2006/085116, the specific filters employed in FIGS. 2 and 3 may be constructed solely to carry out their intended specific function. Thus whilst filters 504 and 507 may have variable centre frequency, a fixed bandwidth may be all that is required. Filters 502 and 503 may have only a variable high pass/low pass filter edge.

In a modification of the circuit of FIG. 3, where only a limited number of possible characteristics for band stop filter 506 may be envisaged, the agile filter may be replaced by a bank of fixed band stop filters, each filter having one of the envisaged characteristics.

The invention claimed is:

1. A method of filtering channels in a telecommunications satellite, comprising:
    monitoring at least one channel of an uplink signal by stepping across said one channel with a first analog agile filter having a narrow bandwidth in relation to the channel, and at each step monitoring the signal within the channel step, in order to determine the presence of interfering signals;
    providing a filter arrangement, comprising at least a second analog filter, having an adjustable band stop function; and configuring said filter arrangement to block said interfering signals.

2. A method according to claim 1, comprising providing first and second signal paths for said uplink signal, demultiplexing the channels of said uplink signal onto separate lines in said first path, carrying out said band stop function within said second signal path, providing to said first path a remaining filtered part of said one channel and replacing, by means of a switching operation, the demultiplexed version of said one channel, with said remaining filtered part.

3. A channel filtering apparatus for a telecommunications satellite, including:
- a monitoring arrangement, for monitoring at least one communication channel of an uplink signal, for detection of interfering signals, including an analog agile filter for stepping across said one channel and having a narrow bandwidth in relation to said one channel, and a controller for determining within each step the presence of an interfering signal; and
- an analog filter arrangement responsive to said monitoring arrangement, which provides an adjustable band stop function for blocking said interfering signal.

4. A channel filtering apparatus as claimed in claim 3, wherein said monitoring arrangement is configured to determine signal power within each channel.

5. A channel filtering apparatus as claimed in claim 4, including first and second signal paths for said uplink signal, said first path including a demultiplexer for demultiplexing the channels of said uplink signal onto separate lines in said first path, said second signal path including said filter arrangement for carrying out said band stop function and for providing to said first path a remaining filtered part of said one channel and a switch arrangement within said first path for replacing the demultiplexed version of said one channel, with said remaining filtered part.

6. A channel filtering apparatus as claimed in claim 4, wherein said analog filter arrangement comprises an analog agile filter providing a band stop function.

7. A channel filtering apparatus as claimed in claim 3, including first and second signal paths for said uplink signal, said first path including a demultiplexer for demultiplexing the channels of said uplink signal onto separate lines in said first path, said second signal path including said filter arrangement for carrying out said band stop function and for providing to said first path a remaining filtered part of said one channel and a switch arrangement within said first path for replacing the demultiplexed version of said one channel, with said remaining filtered part.

8. A channel filtering apparatus as claimed in claim 7, wherein said analog filter arrangement comprises two analog agile filters for providing a high pass function and a low pass function positioned on either side of the interference signal, and means for combining the outputs of the two filters.

9. A channel filtering apparatus as claimed in claim 7, wherein said analog filter arrangement comprises a bank of bandstop filters having different bandstop characteristics.

10. A channel filtering apparatus as claimed in claim 7, wherein said monitoring arrangement includes a telemetry link to a ground station.

11. A channel filtering apparatus as claimed in claim 3, wherein said analog filter arrangement comprises two analog agile filters for providing a high pass function and a low pass function positioned on either side of the interference signal, and means for combining the outputs of the two filters.

12. A channel filtering apparatus as claimed in claim 3, wherein said analog filter arrangement comprises an analog agile filter providing a band stop function.

13. A channel filtering apparatus as claimed in claim 3, wherein said analog filter arrangement comprises a bank of bandstop filters having different bandstop characteristics.

14. A channel filtering apparatus as claimed in claim 3, wherein said monitoring arrangement includes a telemetry link to a ground station.

* * * * *